April 27, 1965  J. VILLIERS  3,181,143
OMNI-DIRECTIONAL ALTIMETRIC RADAR
Filed March 6, 1961  4 Sheets-Sheet 1
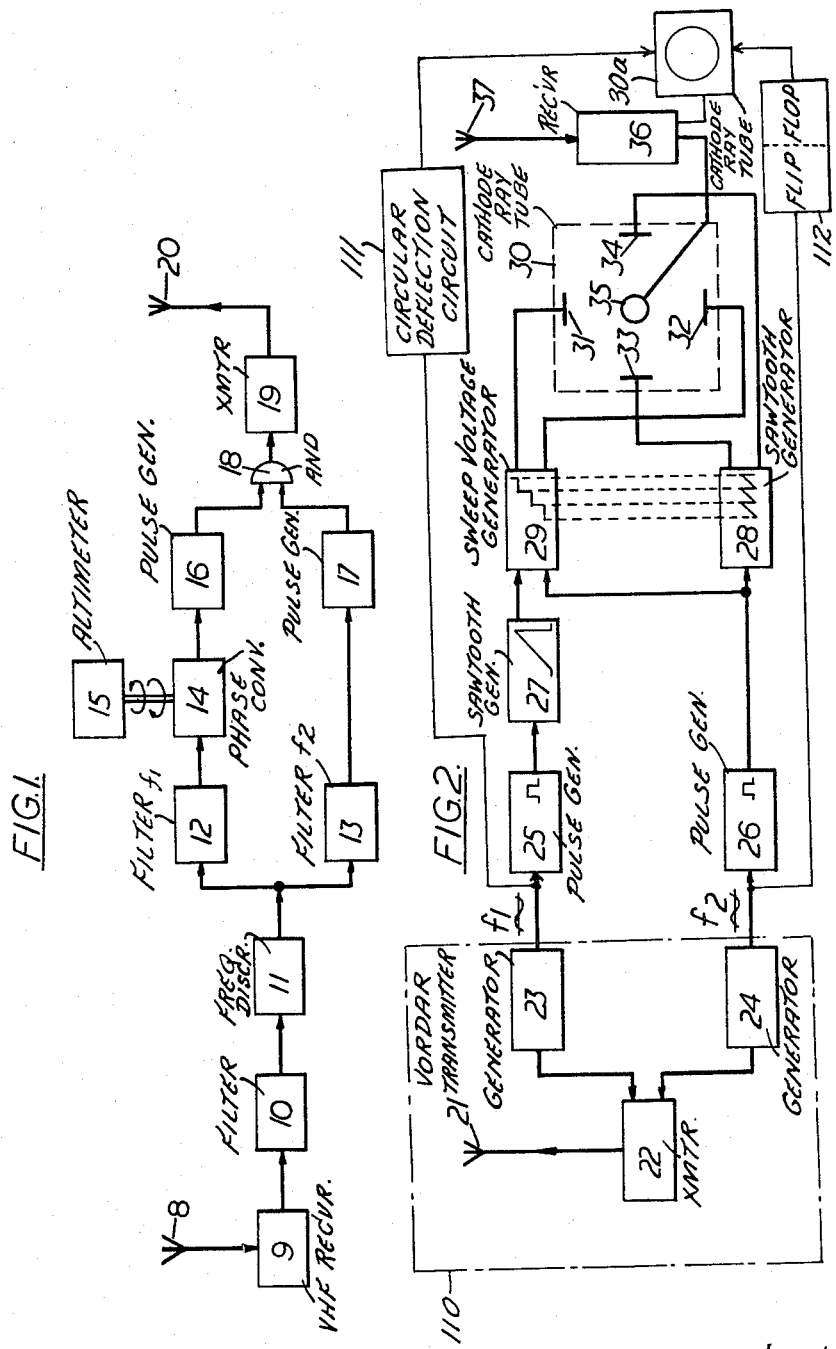
Inventor
J. Villiers
By *R.F. Morris*
Attorney Fig. 4
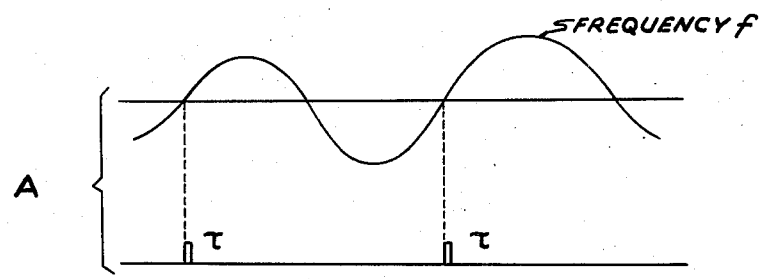
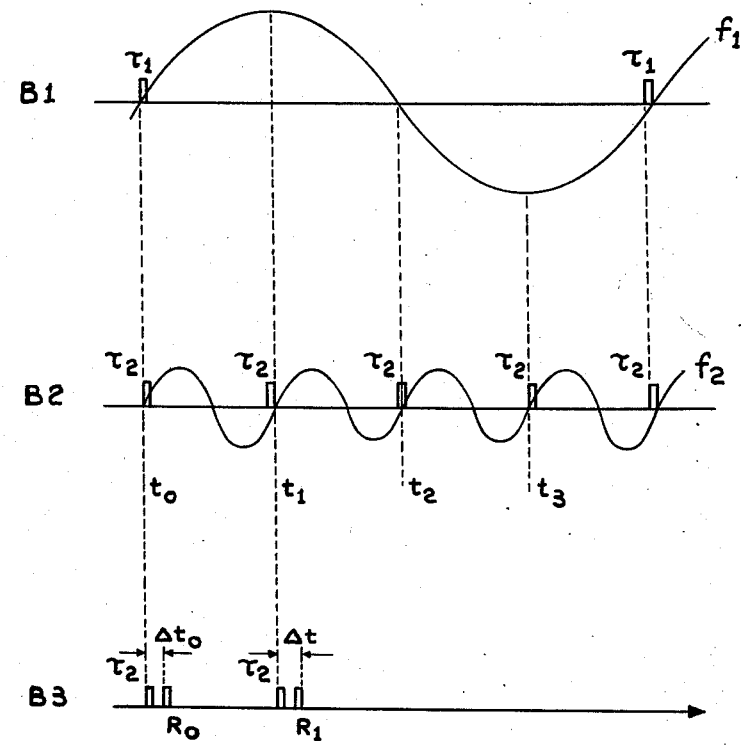

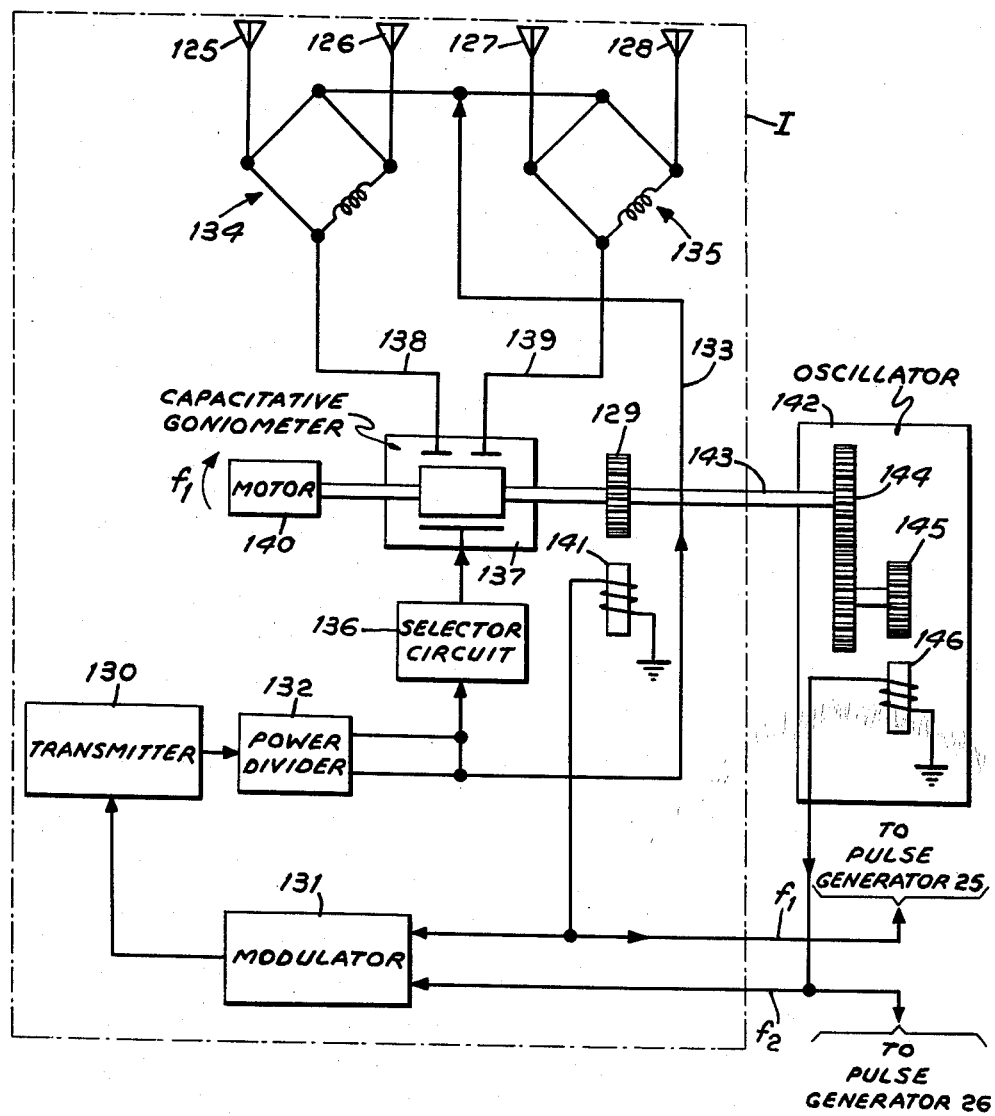

United States Patent Office 3,181,143
Patented Apr. 27, 1965

3,181,143
OMNI-DIRECTIONAL ALTIMETRIC RADAR
Jacques Villiers, Paris, France, assignor to International Standard Electric Corporation, New York, N.Y., a corporation of Delaware
Filed Mar. 6, 1961, Ser. No. 93,698
Claims priority, application France, Mar. 16, 1960, 821,521
5 Claims. (Cl. 343—6)

The present invention relates to the ground control station in an air navigation system, and more particularly to a display system of altitude and distance location of mobile crafts equipped with a responder.

It is well known that radars are not well adapted for altitude measurements which have to be determined not only from distance measurements which are accurate but also from elevation measurements which are inaccurate beyond a small range.

Rotating beacon radio navigation systems are also known which provide a bearing display of suitably equipped aircrafts moving in a predetermined space but they do not provide any display of the altitude position.

One of the objects of the present invention is to permit a ground station provided with a very-high frequency radio transmitting equipment and a cathode-ray tube, to obtain an altitude and distance display of the position of aircrafts provided with a responder and moving within radio line-of-sight range from the said ground station.

For this purpose, two low frequency signals of different frequencies are simultaneously transmitted by a ground station, the mobile stations phase shift one of these signals according to their altitude and transmit a response signal when they ascertain a determined phase relationship between the thus phase shifted first signal and the second signal. The first signal thus acts as a vertical cyclic sweeping of space by a horizontal slice of small thickness and the second signal is a synchronizing signal between the ground station and the mobile stations. This synchronizing signal may be composed of either definite recurrence frequency pulses or of a modulation of a second transmitted signal as explained later in more detail.

According to a preferred embodiment of the invention, the ground station transmits a very-high frequency omni-directional wave modulated by low frequency $f_1$ and $f_2$ signals having between them the relation:

$$f_2 = nf_1 + \epsilon$$

where $\epsilon$ is a resolution factor more fully described later in the description of the operation of this invention.

In order to prevent interferences and allow the 300 to 3,000 c./s. frequency band to be available for a simultaneous telephone modulation, there is an advantage to amplitude modulate a very high frequency wave with a frequency F sub-carrier wave itself frequency-modulated by signals of frequency $f_1$ and $f_2$.

The mobile stations are equipped with means for receiving signals of frequency $f_1$ and $f_2$, phase shifting the first signal at an angle proportional to their altitude, obtaining from the phase shifted signal $f_1$ and from signal $f_2$ pulses having respectively a $\tau_1$ and $\tau_2$ duration and a determined phase relationship from each of them, and transmitting a response signal when a coincidence occurs between two of the above defined pulses.

The ground station comprises means for receiving these response signals and applying them for instance to a type E display cathode ray tube, provided with a particular sweeping device controlled on the one hand by a sawtooth-shaped voltage at frequency $f_2$ and on the other hand by a sawtooth-shaped voltage at recurrence frequency $f_1$ modulated by a stepped voltage at frequency $f_2$.

There is thus obtained a Cartesian coordinate display of distances to the ground station and altitudes of the aircraft transmitting response pulses.

This distance and altitude position display of the mobile stations in the very-high frequency range of the ground station may be associated to the distance and azimuth display provided either by a radar or by a rotating radio-beacon system for locating mobiles such as the so-called "Vordar" as described in U.S. patent application Serial No. 3,171 filed by the applicant on January 18, 1960, in order to obtain thereby a three dimension air traffic display.

In the case of the association of a radar and a radio telephone channel, the signal at frequency $f_1$ may be transmitted on this channel without defect on the voice communication. The transmission of the signal at frequency $f_2$ which is normally in the telephone communication passband may be effected by modulating a sub-carrier wave, but it is simpler, when possible, to utilize as frequency $f_2$ the recurrence frequency of radar pulses. The association with a DME/T equipment may be realized in the same manner by initiating the transmission by the DME/T ground station of suitably coded pulses having a recurrence frequency $f_2$. That is to say, it is possible to transmit signals $f_1$ and $f_2$ in the form of sine waves over telephone wires without deterioration of the signals and after such transmission is made convert them into pulse signals for use in radar or DME/T as may be required.

The VORDAR system comprises, in addition to the means for beaming an omni-directional reference wave modulated by a first signal at frequency $f_1$ and a directional-pattern measuring wave rotating at a speed of $f_1$ revolutions per second, additional means for modulating the reference wave by a second signal of appropriate frequency $f_2$, greater than $f_1$, an RF receiver for receiving pulses sent by the moving object and a plan-position cathode-ray tube, or panoramic tube, receiving said pulses and provided with a special scanning device controlled by the first signal at frequency $f_1$ and by pulses taken from the second signal at frequency $f_2$.

The receiver borne by the moving object comprises, in addition to the means for separately picking up the reference signal and the measuring signal and comparing their respective phases, means for taking from the measuring signal at frequency $f_1$ first pulses of length $\tau_1$ and of frequency $f_1$ having a well-defined phase relationship with the measuring signal, means for extracting the second signal at frequency $f_2$ from the reference wave and for taking from said second signal second pulses of length $\tau_2$ and of frequency $f_2$ having a well-defined phase relationship with the second signal, a coincidence circuit producing output pulses when it simultaneously receives at its inputs a first pulse and a second pulse, and an RF transmitter sending these output pulses.

In the case of association with a Vordar system, the signal of modulation frequency $f_1$ of the omni-directional pattern reference wave of the V.O.R. radio beacon and the signal at frequency $f_2$ of additional modulation proper to Vordar may be utilized provided that means for differentiating altitude and distance response signals from azimuth and distance response signals are added to existing equipments. In this case, it is moreover favorable to have these signals alternated so as to obtain a permanent display in two coordinate systems.

The invention will be better understood from the reading of the following description in conjunction with the attached drawings, in which:

FIGURE 1 schematically represents a mobile station equipment according to the present invention;

FIGURE 2 schematically represents a ground station equipment according to the present invention;

FIGURE 4 represents waveforms useful in describing this invention; and

FIGURE 5 shows the details of a Vordar transmitter for a ground station.

Figure 3:
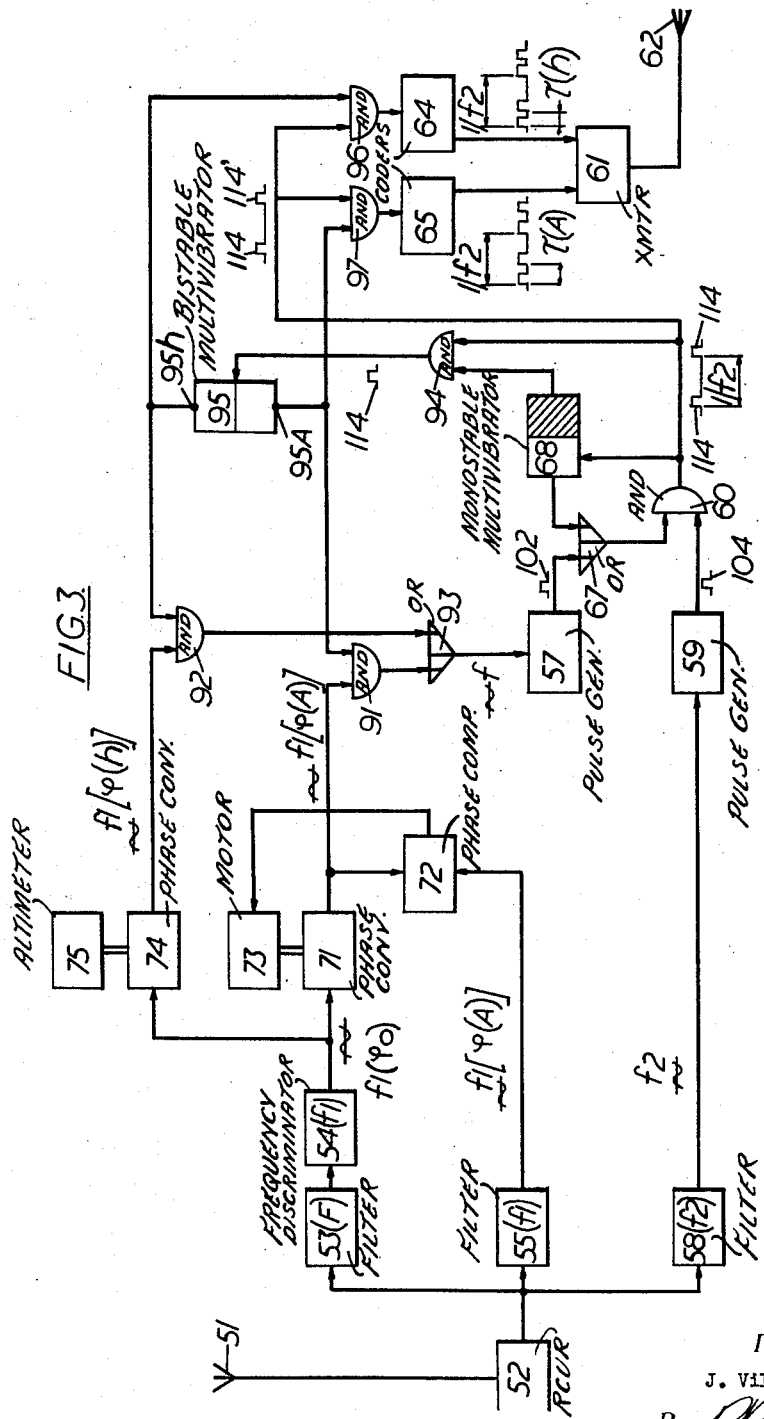
FIGURE 3 represents an arrangement according to FIGURE 1, suitable for a mobile station Vordar equipment.

The mobile station equipment represented in FIGURE 1 comprises antenna 8, V.H.F. receiver 9, band filter 10 for the sub-carrier wave of frequency F and frequency discriminator 11 the output of which is applied respectively to filter 12 for discriminating $f_1$ frequency modulation signal and to filter 13 for discriminating $f_2$ frequency modulation signal. The output of filter 12 is connected to phase converter 14 which is driven by altimeter 15 so that a signal of frequency $f_1$ is submitted to a phase rotation proportional to altitude, for instance, 24° for 1,000 meters. The output of phase converter 14 is connected to pulse generator 16 which generates a pulse of duration $\tau_1$ each time that the signal of frequency $f_1$ and phase $\varphi(h)$ which is applied to it passes through zero by increasing values.

The output of filter 13 is connected to pulse generator 17 which generates a pulse of duration $\tau_2$ each time that the signal of frequency $f_2$ which is applied to it passes through zero by increasing values. The outputs of pulse generators 16 and 17 are connected to the two inputs of "AND" gate 18 respectively the output of which provides a control pulse when a coincidence occurs between pulses applied to its inputs. The control pulse applied to transmitter 19 initiates transmission by means of antenna 20, of a response signal to the ground station represented on FIGURE 2.

Antenna 21 of the ground station omnidirectionally radiates a V.H.F. signal transmitted by transmitter 22 and modulated by first generator 23 of frequency $f_1$ and second generator 24 of frequency $f_2$. When these signals are received by mobile stations provided with the equipment represented on FIGURE 1, these mobile stations transmit response signals under the above defined conditions. These response signals are received by means of antenna 37 and receiver 36 of the ground station and applied to control electrode 35 of cathode ray tube 30 for initiating the spot illumination on the screen. The sweeping of this screen, assumed to be in Cartesian coordinates, is effected in a horizontal direction by a sawtooth-shaped voltage of recurrence frequency $f_2$ and in a vertical direction by a sawtooth-shaped voltage of recurrence frequency $f_1$ modified so as to vary by steps at frequency $f_2$. For this purpose, frequency generators 23 and 24 are respectively connected to pulse generators 25 and 26 which provide a pulse when the sinusoid representing the signal they receive, passes through zero by increasing values. Pulse generator 26 controls generator 28 of sawtooth-shaped signals at recurrence frequency $f_2$ which are applied to horizontal deflection plates 33 and 34 of cathode ray tube 30. Pulse generator 25 controls generator 27 of sawtooth-shaped signals at recurrence frequency $f_1$; this sawtooth-shaped signal and pulses at recurrence frequency $f_2$ generated by generator 26, are applied to stepped sweeping voltage generator 29 which controls the vertical deflection of tube 30 by means of plates 31 and 32. Screen horizontal axis of tube 30 is thus the $\rho$ distance axis of the mobile stations the response signals of which are displayed with a vertical coordinate representing their altitude $h$.

With regard to FIGURE 4, waveform A shows a pulse of duration $\tau$ each time a signal of frequency $f$ passes through zero by increasing value. Waveform $B_1$ represents a since wave at frequency $f_1$ and pulses $\tau_1$, derived from it in the ground station. Waveform $B_2$ represents a sine wave at frequency $f_2=4f_1 (n=4)$ and pulses $\tau_2$ derived from it in the ground station.

Pulses of duration $\tau_1$ and $\tau_2$ will be derived in the same manner from the corresponding signals in the aircraft. It is then clear that pulses of duration $\tau_2$ (while not transmitted) act in the same manner as pulses which would have been radiated by a radar at a pulse repetition frequency equal to $f_2$, since the sine wave $f_2$ is not phase shifted in the receiver (a phase shift occurs only due to propagation time). Then the time difference between pulse $\tau_2$ thus generated in the ground station and the pulse response transmitted by the aircraft is the same as in the case of a radar and is proportional to the distance of the aircraft from the ground station (waveform $B_3$). It can be seen in a simple manner that this response, when it occurs, gives the knowledge of the altitude of the aircraft. Let us call $t_0$, $t_1$, $t_2$, $t_3$ the respective instants when the four pulses of derivation $f_2$ are derived from $f_1$ during a single period of $f_1$. The aircrafts which are at altitude 0 at the instant $t_0$ will generate a pulse ("and" condition at the input of gate 18) and transmit a response $R_0$ to the interrogation from the ground station (waveform $B_3$). The responses $R_0$ arrive at the ground station at an instant $t_0+\Delta t_0$, $\Delta t_0$ being the time of propagation and being proportional to the distance of the aircraft. The aircrafts which are not at this altitude will not respond. Since the sine wave at frequency $f_1$ is phase shifted in the airbone receiver proportionally to the aircraft altitude, the aircrafts which are flying at the instant $t_1$ at an altitude corresponding to a phase shift of 90° for $n=4$ and with the assumption stated in column 3, lines 14 to 18, this 90° phase shifting is accomplished in the receivers flying at an altitude of $$\frac{1000 \times 90}{24} = 3,750 \text{ m}.$$

and these aircrafts only will generate a response $R_1$ to the interrogation from the ground station. These responses $R_1$ arrive at the ground station at an instant $t_1+\Delta t_1$, $\Delta t_1$ being the time of propagation and being then proportional to the distance of the aircraft.

The functioning of the system when $n$ is different $n=4$ and $\epsilon$ is different from zero ($f_2=nf_1+\epsilon$) will be described later. Voltage generator 29 is a stepped sweeping voltage generator because the altitude of the responding aircraft corresponds to the phase of signal $f_1$ in the ground station *at the instant* that pulse $\tau_2$ is generated from signal $f_2$ in the ground station and not at the instant of the reception of the response R from the said aircraft. This display corresponds to the position in distance and altitude of the mobile stations. In fact signal of frequency $f_2$ synchronizes a sweeping of space around the ground station and pulses of duration $\tau_2$ obtained therefrom by the mobile stations define annular spaces the distance of which to the ground station is $\rho$ and the width of which can be expressed in kilometers by the formula $$d\rho = \frac{300,000\tau_2}{2}$$

Signal of frequency $f_1$ synchronizes a second sweeping of space and the pulses of duration $\tau_1$, which are obtained by the mobile stations from this phase shifted signal depending on their altitude, correspond to horizontal slices of altitude $h$ and thickness $dh$. The coincidence on board the aircraft of the pulses of duration $\tau_1$ and $\tau_2$ from signals of frequency $f_1$ and $f_2$ defines therefore its coordinates $\rho$ and $h$.

If $f_2$ is an integral multiple of $f_1$ the number of altitude slices which can be successively scanned would be reduced to $$\frac{f_2}{f_1}$$

i.e. for instance to $$\frac{600}{30} = 20$$

with $f_1=30$ c./s. and $f_2=600$ c./s. The result therefore is altitude resolution of the order of one thousand meters, which is sufficient for the air navigation control requirements. $f_2$ is therefore chosen to have a slightly different value from an $f_1$ harmonic frequency in such a manner that the altitude scanning shifts from one vertical sweeping to the next, from which it follows that the complete space sweeping requires a certain number of cycles at frequency $f_1$.

If, for instance, there is desired to obtain a resolution of 50 meters between 0 and 15,000 meters for a frequency $f_1$ equal to 30 c./s., $f_2$ will be equal to 602 c./s., i.e.

$$f_2 = 20f_1 + \frac{f_1}{15}$$

and the complete cycle is performed in:

$$15f_1 = 0.5 \text{ second}$$

The corresponding theoretical duration $\tau_1$ of the pulse responsive in the mobile stations to the signal of frequency $f_1$ is then of the order of ten thousandth of a second. In fact, the duration $\tau_1$ is a little longer in order to secure a sufficient overlapping between adjacent levels.

FIGURE 3 represents, by way of a non-limitative example, the adaptation of the system according to the present invention to a mobile station Vordar equipment.

It is known that the ground Vordar stations comprise means for radiating an omni-directional reference wave modulated by a sub-carrier wave of frequency F itself modulated by two signals, one of frequency $f_1$, and the other of high frequency $f_2$ varying from one station to the other and an azimuth measuring wave having a directional pattern rotating at the rate of $f_1$ rotations per second. In FIGURE 2 the Vordar ground station transmitter is shown broadly within the dashed line box 110. Signal $f_1$ is fed to a circular deflection circuit 111 and the output of the circular deflection circuit 111 is coupled to the cathode ray tube 30a. Signal $f_2$ is also connected to a flip-flop circuit 112, the output of which is coupled to the cathode ray tube 30a to produce a radial beam deflection. Thus there is produced a panoramic display of the distance and azimuth of the mobile station relative to the ground station.

The details of the Vordar transmitter are disclosed in FIG. 5 where a VOR of standard type, such as those currently used in civil aviation, is shown within the broken lines of box I. It comprises four antennas 125, 126, 127, 128 arranged at the corners of a square, the antennas 125 and 126 and the antennas 127 and 128 being diagonally opposite. These four antennas are supplied (1) in phase by a VHF carrier wave, modulated by a sub-carrier wave at frequency F, itself modulated by a signal at frequency $f_1$, and (2) with suitable respective phases by the same carrier wave, non-modulated. Also transmitted with the standard VOR signal is another sine wave signal $f_2$ phase locked to the 30 c.p.s. VOR reference signal as will be described subsequently. The sub-carrier F is dependent upon the number of teeth on tone wheel 129 and its speed of rotation. The teeth of the wheel 129 have variable spacing to generate in a coil a nominal frequency of F cycles modulated at the $f_1$ rate. The VHF power is produced by a transmitter 130, modulated by a modulator 131. The output of this transmitter is connected to a power divider 132 having two outputs. The first output is connected to power-supply line 133, which supplies the antennas in phase across balanced branches of bridges 134 and 135, by the reference wave doubly modulated at frequencies F and $f_1$. The second output is connected to a selector circuit 136 that serves to eliminate any modulation and to restore the pure carrier wave, then to a capacitive goniometer 137 outgoing from which are the supply lines 138 and 139 that supply the antennas 125–126 and 127–128 across branches of bridges 134 and 135, introducing appropriate fixed phase displacement, e.g. 90°. Capacitive goniometer 137 is made to rotate at an angular velocity of $f_1$ revolutions per second by a motor 140. This motor also drive the tone wheel 129 whose teeth are suitably cut to induce in a coil 141 an A.C. at a frequency F modulated in frequency at frequency $f_1$. This current is applied to modulator 131.

For example, in standard VOR's, the frequencies F=9960 cycles and $f_1$=30 cycles have been selected.

The following steps are taken in order to convert a VOR transmitter into a Vordar transmitter:

An oscillator 142 is synchronized to VOR frequency $f_1$, producing a signal at frequency $f_2$ such that $f_2$ equals $kf_1$ (where k is an improper fraction).

All known means for synchronizing an oscillator to frequency $f_2$ by the VOR's portion producing the signal at frequency $f_1$ can be used. For example, it is possible to connect, on shaft 143 of motor 140, which drives capacitive goniometer 137 and tone wheel 129 at an angular velocity of $f_1$ revolutions per second gear 144 (or a friction transmission device) of ratio r whose outgoing shaft drives a tone wheel 145 comprising d teeth regularly spaced and so profiled that they generate in a magnetic pick-up 146 a sinusoidal signal at the frequency $f_2 = rf_1 d$. It is also possible to take, as will be shown in what follows (with $f_1$=30 cycles):

$$r = \frac{301}{300} \text{ and } d=20 \text{ or } k=rd=\frac{301}{15}$$

whence $f_2$=602 cycles.

The signal at frequency $f_2$ is applied (1) to modulator 131 and (2) to pulse generator 26, and the $f_1$ signal is applied to pulse generator 25.

On the other hand, it is also known that the mobile station Vordar equipments comprise, as represented in FIGURE 3, receiving antenna 51, receiver 52 connected to three channels:

(a) The frequency channel, comprising band filter 53 having a middle frequency equal to F, followed by frequency discriminator 54 giving the reference phase $\varphi_0$ signal at frequency $f_1$;

(b) The azimuth measuring channel comprising low-pass filter 55 giving the phase $\varphi(A)$ measuring signal at frequency $f_1$ generated by the rotation of the rotating directional pattern;

(c) The distance channel comprising band filter 58 the middle frequency of which is the mean value of frequencies $f_2$ of the various Vordar ground stations. The reference signal at frequency $f_1$ is put in phase coincidence with the measuring signal at frequency $f_1$ by phase shifter 71 positioned by motor 73 so as to cancel the error signal, which is the output of phase comparator 72 receiving both signals at frequency $f_1$.

According to the present invention, the signal at frequency $f_1$ from phase converter 71 is applied to an input "AND" gate 91, the second input of which is controlled by output 95A of bistable flip-flop 95, and second phase converter 74 is connected to the output of frequency discriminator 54 of the reference channel in parallel with phase converter 71. Phase converter 74 is driven by altimeter 75 so that it performs a rotation proportional to the altitude, for instance, 24° for one thousand meters of altitude, i.e. 360° between zero and 15,000 meters. The signal of frequency $f_1$ and phase $\phi(h)$ from phase converter 74 is applied to an input of "AND" gate 92 the second input of which is controlled by output 95h of bistable flip-flop 95. The output of bistable flip-flop 95 thus opens gate 91 and closes gate 92 and vice versa in accordance with the change of condition of flip-flop 95. The outputs of gates 91 and 92 are connected to two inputs of "OR" gate 93 which applies to pulse generator 57 the signals of frequency $f_1$ alternately phase shifted depending on the azimuth and on the altitude according to the condition of bistable flip-flop 95. As it is known, the pulse generator 57 generates, each time the signal of frequency $f_1$ which is applied to it passes through zero by increasing values, a pulse 102 which is transmitted through "OR" gate 67 to "AND" gate 60 the second input of which receives pulses 104 generated by pulse generator 59 each time the signal of frequency $f_2$ passes through zero by increasing values. When pulse 104 is coincident with pulse 102, gate 60 provides pulse 114 which is repeated by pulse 114' under the effect of the following pulse 104, gate 60 being held open for a sufficient time by means of flip-flop 68 controlled by pulse 114 the unstable set output of which is connected to a second input of "OR" gate 67.

According to the present invention, flip-flop 68 has a sufficient delay to produce an output in its unstable set condition only at the end of pulse 114.

Pulses 114 and 114' from "AND" gate 60, applied as it is known to flip-flop 68 on which the second pulse has no effect, are on the other hand applied to three "AND" gates 94, 96 and 97.

"AND" gate 94, which receives an unlocking potential from flip-flop 68 only when the latter is in a stable reset condition, transmits pulses 114 and blocks pulses 114'. Pulses 114 from gate 94 are applied to bistable flip-flop 95 which changes its condition under the effect of each one of them. An unlocking potential is thus alternately provided by output 95A to "AND" gates 91 and 97 and by output 95h to "AND" gates 92 and 96. Accordingly, pulses 114–114' resulting from the coincidence of pulse 104 and pulse 102 provided by pulse generator 57 from signal of frequency $f_1$ and phase shifted by an angle $\varphi$ (A) proportional to the azimuth of the mobile station with respect to the Vordar ground station, pass through "AND" gate 97 whereas pulses 114–114' resulting from the coincidence of pulse 104 and pulse 102 provided by pulse generator 57 from signal of frequency $f_1$ phase shifted by an angle $\varphi(h)$ proportional to the altitude of the mobile station pass through "AND" gate 96. Pulses 114–114' from gate 97, each of which is converted into a pair of pulses of $\tau(A)$ spacing characteristic of the azimuth, by coder 65, and pulses 114–114' from gate 96, also converted into pairs of pulses of $\tau(h)$ spacing characteristic of the altitude, by coder 64, are alternately applied to transmitter 61 which thus radiates by means of antenna 62, alternately:

Two specific signals of the mobile station bearing from the Vordar ground station with which the mobile station is in communication, spaced one from the other by a time interval $$\frac{1}{f_2}$$

characteristic of the distance of the said ground station:

Two specific signals of the mobile station position in distance from the said ground station and in altitude, spaced one from the other by a time interval.

$$\frac{1}{f_2}$$

The time interval $$\frac{1}{f_2}$$

is equal to a period of the additional modulation signal proper to the Vordar ground station to the signals of which the mobile station responds. This time interval is utilized, as known, by each Vordar ground station for discriminating among the signals received on a determined air-ground frequency, the responses which are addressed to it from those which are addressed to surrounding stations. The Vordar ground stations have moreover means for directing the pairs of response pulses of spacing $\tau(A)$ towards the cathode ray tube 30a providing a panoramic display of the mobile station bearings and the pairs of response pulses of spacing $\tau(h)$ towards E type cathode ray tube such as 30 (FIGURE 2) giving a distance and altitude Cartesian coordinate display of the position of mobile stations. Sweepings of the two tubes, taking into account their differences, are conjugated and in order to facilitate the interpretation of correspondence between the displays supplied by the panoramic screen and the E type screen, a distance marker simultaneously having an effect on these two screens is favorably utilized.

While the invention has been described in connection with a specific embodiment, it will be clear that general applications may be made without departing from the scope of the invention, particularly in phase shifting the reference signal of frequency $f_1$ by a different control than the altimeter control and which can be provided by an other board instrument or manual control.

What is claimed is:

1. An omnirange beacon system having means for radiating a rotating direction indicating signal in a radiation pattern at a first frequency and a reference signal at said first frequency and a second signal at a frequency higher than said first frequency to a craft from which indications of the position of the craft can be produced comprising means on said craft for receiving said signals, means for deriving from the received signals said signals at said first frequency and said signals at said higher frequency, indicating means at said beacon synchronized with said signals of said first frequency and said higher frequency, and on said craft means for deriving a signal responsive to the phase difference between said direction indicating signal and said reference signal indicative of the azimuth of said craft, means for dividing said reference signal into two channels, an altimeter, means for modulating said reference signal in one of said channels with the output of said altimeter, means for generating pairs of signals responsive to the frequency of said second signal, first means for encoding said pairs of signals with said signal indicative of the azimuth of said craft, second means for encoding said pairs of signals with the signals indicative of the altitude of said craft, means to transmit said first and second coded signal pairs, means at said beacon to determine the time delay between signals transmitted from said beacon and return signals transmitted from said craft to derive therefrom signals indicating the distance of said craft from said beacon, means at said beacon station to receive said transmitted coded signals, means at said beacon station to derive from said coded signals said signals indicative of the altitude and azimuth of said craft and means for applying said signals containing the azimuth and altitude information and said distance indicating signals to said indication means to produce thereon an indication of the bearing, range and altitude of said craft with respect to said beacon.

2. An omnirange beacon system according to claim 1 further comprising means on said craft responsive to said signals of said first frequency and said higher frequency to generate said pairs of signals, and means for gating said pairs of signals to said encoding means for encoding said pairs of signals respectively with azimuth and altitude information.

3. An omnirange beacon system according to claim 1 wherein each said pair of signals is in the form of a pair of twin pulses having a spacing between each of said pair of twin pulses equal in time to the reciprocal of the frequency of said second signal.

4. An omnirange beacon system according to claim 3 wherein said indicating means comprise first and second indicating devices and one of said pair of twin pulses is applied to one of said indicating devices for producing an indication of the distance and altitude of said craft and the other of said pair of twin pulses is applied to said other of said indicating devices for producing an indication of the distance and angular position of said craft with respect to said beacon.

5. An omnirange beacon system according to claim 4 wherein said first and second indicating devices are oscilloscopes and further comprising means to produce a rotary deflection of the beam of said first oscilloscope in synchronism with said first frequency signal and a radial deflection of said beam in synchronism with said higher frequency signal to produce an indication of distance and azimuth of said craft with respect to said beacon, means at said second oscilloscope for generating a first sawtooth signal equal in frequency to said higher frequency signal, means for applying said first sawtooth signal to one set of deflection plates of said second indiacting device, means for generatign a second sawtooth signal equal in frequency to said reference signal responsive to said first frequency signal, means for producing a step signal from said second sawtooth signal and said higher frequency signal, means for applying said step signal to the other of said deflection plates of said second indicating device, and means for varying the brightness of the beam of said second oscilloscope responsive to said altitude indicating signal for producing an indication of the distance and altitude of said craft with respect to said beacon on said second indicating device.

References Cited by the Examiner

UNITED STATES PATENTS 2,634,411  4/53  Wallace _____ 343—6
2,666,198  1/54  Wallace _____ 343—11

CHESTER L. JUSTUS, *Primary Examiner.*

MALCOLM A. MORRISON, KATHLEEN CLAFFY,
*Examiners.*